United States Patent Office 3,066,103
Patented Nov. 27, 1962

3,066,103
MANGANESE FERRITES
Douglas Hiley Owen, London, England, assignor to International Standard Electric Corporation, New York, N.Y., a corporation of Delaware
No Drawing. Filed July 6, 1959, Ser. No. 824,904
Claims priority, application Great Britain Aug. 7, 1958
10 Claims. (Cl. 252—62.5)

The present invention relates to the manufacture of ferrites containing manganese and more particularly to an improved method in which special measures are taken to control the gas atmosphere in the furnace in which the ferrites are made.

In the known method of producing manganese ferrites, a finely ground, intimate mixture of suitable oxides is pressed into the required shape and subjected to a prolonged heat treatment. The heating takes place in a gas tight sealed furnace and in an atmosphere which must be varied for the various stages of the reactions which take place. For manganese-zinc ferrite, for example, there is described in British patent specification No. 730,703 a method of manufacture requiring three distinct stages, i.e. a warming up, a constant temperature, and a cooling down stage. Each requires a particular temperature and rate of flow and composition of gas atmosphere, the rates of flow being maintained at values which are determined empirically in terms of the volume of the furnace and the weight of the ferrite used and based on the magnetic properties required of the finished product. The above patent describes the variations in magnetic properties which are brought about by changes in these conditions.

One of the major problems associated with this treatment lies in ensuring that all of the ferrite shapes in the furnace are subjected to the same temperature and gas flow. In a large furnace there are variations in these conditions from one place to another and this causes differences in the composition and magnetic properties of the final products. Moreover, the process is wasteful with respect to the gases, which must be passed through the furnace in large quantities, and finally, it is impossible to carry out a continuous process on these lines since the rapid rate of diffusion of one gas through another prevents the maintenance of three separate gas phases in the same enclosure.

Accordingly the present invention provides a method of making a ferrite containing bivalent manganese ions from a mixture of oxides including a higher oxide of manganese than manganous oxide comprising placing the said mixture of oxides in a furnace, heating the said furnace in the required temperature cycle, and automatically controlling the atmosphere in the said furnace as a function of the temperature by means of an oxidisable material placed in the furnace alongside but not in contact with the said mixture of oxides.

The invention will be better understood from the following description relating to a particular manganese-zinc ferrite.

In the process hitherto used a gas-tight, sealed furnace is provided with inlet and outlet tubes for gas flow and initially contains in trays cores or shapes pressed from the basic materials for making the ferrites. The trays will initially contain cores or shapes pressed from a finely ground mixture of iron oxide, $Fe_2O_3$, manganese oxide, $Mn_3O_4$ or $Mn_2O_3$, and zinc oxide, $Z_nO$, plus .05% of the weight of this mixture of oxides as calcium in the form of calcium carbonate (as described and claimed in U.S. Patent No. 2,903,429, issued September 8, 1959) which has been pressed into the required shape at a pressure of approximately 25 tons per square inch.

Pure nitrogen is passed through the furnace at a controlled rate and the temperature raised to approximately 1200° C. The gas is then changed to a mixture of 1.2% oxygen in nitrogen and the furnace is maintained at this temperature for a period 2 to 4 hours. The gas is then changed again to pure nitrogen and finally allowed to cool down over a period of 10 to 15 hours. It is known to be advisable to change the gas flow to pure nitrogen during the cooling period. After this treatment the shapes have become sintered manganese-zinc ferrite cores and have undergone a dimensional shrinkage of the order of 17%.

Although experience shows that there are complex factors at work which influence the magnetic properties of the finished product we believe that the basic chemical changes which take place during the known process are as follows. The nature of these processes is not necessarily known in the prior art, but has been largely elucidated in the experimental verification of the present invention.

Manganese is introduced into the initial materials used for making the ferrite in the form of the oxide $Mn_3O_4$ or $Mn_2O_3$ (or even as $MnO_2$), since MnO is unstable. However, during the first part of the heat treatment, as the temperature rises to 1080° C. the $Mn_3O_4$ or $Mn_2O_3$ decomposes into MnO and oxygen, the reaction being as follows:

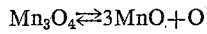

$$Mn_3O_4 \rightleftharpoons 3MnO + O$$
$$Mn_2O_3 \rightleftharpoons 2MnO + O \qquad (1)$$

The oxygen thus evolved is carried away in the current of nitrogen. At 1080° C. the dissociation pressure of $Mn_3O_4$ and $Mn_2O_3$ is 1 atmosphere and as the partial pressure of oxygen in the pure nitrogen is zero the equilibria in (1) are displaced to the right.

As the temperature rises to 1200° C. some of the ferric oxide decomposes into magnetite FeO. $Fe_2O_3$, and oxygen:

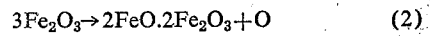

$$3Fe_2O_3 \rightarrow 2FeO.2Fe_2O_3 + O \qquad (2)$$

the oxygen again being removed by the current of nitrogen.

However, the dissociation pressure of this reaction is of the order of 0.1 atmosphere for temperatures up to 1250° C. and hence the decomposition rate of ferric oxide into magnetite is extremely slow. Between 1080° C. and 1200° C. the pressed shapes begin to sinter and shrink.

During the second stage, when the pure nitrogen is changed to a mixture of 98.8% nitrogen and 1.2% oxygen the temperature is maintained at 1200° C., the decomposition rate of the ferric oxide is still extremely slow, since the dissociation pressure of the reaction (2) is slightly below the partial pressure of the oxygen in the nitrogen. Meanwhile the initial mixture is progressively converted into manganese-zinc ferrite, which can be regarded as a solid solution of $FeO.Fe_2O_3$ (magnetite or ferrous ferrite), $MnO.Fe_2O_3$ (manganese ferrite), $ZnO.Fe_2O_3$ (zinc ferrite), plus some unchanged ferric oxide $Fe_2O_3$.

Finally, during the third and final stage when the gas is changed to nitrogen and the furnace cools down, more of the unchanged ferric oxide is converted to magnetite, the partial pressure of oxygen in the pure nitrogen being less than the dissociation pressure of ferric oxide in reaction (2). The oxygen is carried away by the gas stream of pure nitrogen. At temperatures below 1080° C. and above 600° C. manganese-ferrite $MnO.Fe_2O_3$ can absorb oxygen and revert to a mixture of $Mn_3O_4$, $Mn_2O_3$ which, if present in the finished solid solution, leads to a reduction of permeability and an increase in losses. The use of pure nitrogen during the cooling down stage has been adopted in an attempt to prevent any such reabsorption. It is essential that throughout the process the flow rate and composition of the gas should be such that only the required amount of $Fe_2O_3$ is converted to $FeO.Fe_2O_3$. In particular the final amount of $Fe_2O_3$ present should lie between 49.7 and 50.3 molar percent of the total material. If it is allowed to fall outside these values the magnetic properties of the material are considerably worsened.

Thus, by a proper choice of the rate of gas flow and oxygen content of the gas media a true mixed ferrite can be obtained without any uncombined iron oxide, manganese oxide or zinc oxide remaining. The small quantity of calcium oxide appears to form complex, high resistivity manganese compounds in the grain boundaries between the ferrite crystals, resulting in a ferrite with low eddy current losses and high overall resistivity (as pointed out in U.S. Patent No. 2,903,429).

In one process according to the present invention there is used a gas tight sealed furnace with trays containing the basic materials for forming the ferrite. In the case of manganese zinc ferrite these are pressed shapes of a finely ground miture of iron oxide FeO, manganese oxide $Mn_3O_4$ or $Mn_2O_3$, and zinc oxide ZnO, plus .05% of the weight of this mixture of oxides as calcium in the form of calcium carbonate. Also in the furnace is a small amount of a suitable oxidisable material or getter which is placed alongside the pressed shapes but not touching them. The furnace is initially filled with air and is fitted with a pressure compensating valve which allows for any expansion or contraction of the gas in the furnace resulting from temperature changes in the heat treatment cycle. The valve is fed with pure nitrogen to maintain a constant pressure inside the furnace and to prevent diffusion of oxygen from outside.

The furnace and its contents are subject to a similar heat treatment as was described above for the known process, i.e. gradually raised up to a temperature of 1250° C. during 4 hours, maintained constant at this temperature for a further 4 hours, and then cooled down to room temperature over a period of approximately 16 hours. However, the furnace in the present embodiment of the invention is sealed and there are no gas flows to be regulated corresponding to those in the known process. Instead the composition of the gas atmosphere inside the furnace at any particular time is determined by the getter material, the materials used for making the ferrite, the temperature and the volume of the furnace etc.

The way in which the getter material regulates the gas atmosphere inside the furnace is believed to be as follows. As the temperature is raised during the heat treatment some of the air in the furnace expands out through the pressure compensating valve before any reaction takes place between air and getter. Above about 500° C., however, the getter material begins to absorb oxygen, which it obtains firstly from the air enclosed in the furnace and secondly from the dissociation of the manganese and ferric oxides (Equations 1 and 2). The amount of getter material must be chosen such that at the end of 4 hours there is only approximately 1% of oxygen remaining in the furnace and that after a further period of 4 hours the enclosed atmosphere consists entirely of nitrogen. This corresponds to the end of the second stage in the known process. The furnace is now cooled down over a period of approximately 16 hours, the sintered material being in the nitrogen atmosphere throughout this period and consequently unable to absorb any unwanted oxygen. As stated above, the pressure compensating valve feeds nitrogen into a reservoir attached to the furnace to maintain constant pressure and prevent diffusion of oxygen in from outside during the cooling down period.

The getter material may be any oxidisable material such as aluminum powder (120 mesh), commercial electrolytic iron powder (200 mesh), molybdenum Permalloy powder (150 mesh), commercial electrolytic manganese (300 mesh), fine gas carbon powder etc. Permalloy is the trade name for a well known high-permeability magnetic alloy. There are two types of molybdenum Permalloy in general use: 4–79 composed of 4% Mo, 79% Ni and 17% Fe; and 2–81 composed of 2% Mo, 81% Ni and 17% Fe. Both types are suitable as getter material in the process according to the invention. However, it is preferred to use commercial electrolytic iron powder. This material commences to oxidise at 500° C. in air and completes oxidation to 96% of the theoretical value, conforming to the equation $$4Fe + 3O_2 = 3Fe_2O_3 \qquad (3)$$

takes place in 12 hours. At 1250° C. in air the same degree of oxidation takes place in 4 hours while at a partial pressure of oxygen of .1 atmosphere it requires 8 hours, the depth of the metal powders remaining constant in each case. These rates of oxidation are of the same order as the rates of the reactions which take place in the formation of the manganese ferrites described above, and accordingly it is possible to calculate and use an amount of electrolytic iron powder which will ensure the correct gas atmospheres in the furnace at the required times.

A getter material which oxidises at too low a temperature or at too rapid a rate produces manganese ferrites having high losses. Similarly a getter which oxidises at too high a temperature or at too slow a rate produces this same effect. The rate of oxidation of getter material is partly governed by the degree of subdivision of the material, in general the finer the powder the more rapid is the reaction.

In the manufacture of manganese-zinc ferrite by the known process a batch of oxides was made by a standard manufacturing process and contained iron oxide, $Fe_2O_3$, manganese oxide, $Mn_xO_y$, and zinc oxide ZnO, plus .05% by weight of calcium carbonate. The weights used were such that the mixture contained 49.6% by weight of iron, 15.5% by weight of manganese, 5.0% by weight of zinc, .01% by weight of calcium and less than .05% by weight of ferrous iron after oxidation. Expressed in molar percentages this is equivalent to 55.32 molar percent of $Fe_2O_3$ 35.16 molar percent of MnO and 9.52 molar percent of ZnO.

This mixture was pressed at 25 tons per square inch into toroidal ring samples suitable for measuring magnetic properties and the rings were then heat treated at 900° C. for 2 hours with free access to air, in order to stabilise the manganese oxide as $Mn_2O_3$. Four rings were then heat treated in a manner similar to that described for the known process, i.e. in a gas-tight sealed furnace with a gas flow of 100 ccs. per minute flowing throughout. A stream of pure nitrogen was passed through the furnace and the temperature gradually raised up to 1250° C. over a period of 4 hours. The nitrogen was then replaced by a mixture of 98.8% nitrogen and 1.2% oxygen, and the temperature maintained constant for a further 4 hours. And finally the gas was changed back to pure nitrogen again and the furnace cooled down in a time of approximately 16 hours.

Four further rings from the same batch of powder and the same preliminary air heat treatment were then subjected to the same cycle in the same furnace, this time with a weight of electrolytic iron powder (—200 mesh) equal to 6% of the total weight of the rings placed beside them. The furnace was closed and initially full of air, no other gas being passed through it.

Measurements made on the eight rings gave the results shown in Table 1 (rings 1–4 were made by the known process and rings 5–8 by the process according to the invention).

Table 1

| Core | $\mu_0$ Initial Permeability | $\frac{H}{\mu^2} \times 10^6$ Hysteresis Loss Constant | $\mu_0 \times Q$ at 100 kc./s. H=4 millioersteds Total Quality Factor |
| --- | --- | --- | --- |
| 1 | 1,720 | 560 | 210,000 |
| 2 | 1,860 | 500 | 200,000 |
| 3 | 1,700 | 610 | 215,000 |
| 4 | 1,900 | 540 | 186,000 |
| 5 | 1,820 | 473 | 331,000 |
| 6 | 1,800 | 448 | 310,000 |
| 7 | 1,810 | 425 | 305,000 |
| 8 | 1,940 | 391 | 342,000 |

In each case the rings produced by the process according to the invention have a lower hysteresis loss constant and higher quality factor than materials produced by the known process.

The effect of varying the relative amount of getter material used is illustrated in Table 2, again with respect to the production of manganese zinc ferrite and the use of commercial electrolytic iron powder. In each example four rings were enclosed with the given percentage weight of getter material and the results in the second, third and fourth columns represent the mean of the measurements on them.

Table 2

| Weight of "getter" as a percentage of the weight of the four rings | Core, $\mu_0$ | $\frac{H}{\mu^2} \times 10^6$ | $\mu_0 \times Q$ at 100 kc./s. H=4 millioersteds |
| --- | --- | --- | --- |
| 5.25 | 935 | 952 | 260,000 |
| 5.55 | 1,055 | 865 | 292,000 |
| 5.8 | 1,380 | 680 | 262,000 |
| 5.9 | 1,620 | 530 | 273,000 |
| 6.0 | 1,850 | 434 | 322,000 |
| 6.1 | 2,090 | 614 | 249,000 |
| 6.2 | 2,120 | 1,509 | 79,800 |

It is to be observed that for manufacture of the material to the limits $$\mu_0 > 1100, \frac{H}{\mu^2} \times 10^6 < 1000$$

and $\mu_0 Q > 150{,}000$ then the amount of getter used must be between 5.8% and 6.1% of the total weight of basic material used. This margin can be maintained quite easily. The sharp deterioration in the properties of the final material which occurs when too much getter material is used is due to too much of the ferric oxide, $Fe_2O_3$, being reduced to magnetite, $FeO.Fe_2O_3$.

The approximate amount of getter material required for a given amount of basic materials and size of furnace can be calculated in the following manner for the case of commercial electrolytic iron powder, which oxidises according to Equation 3 above. Firstly, the weight of getter required to absorb all of the oxygen in the furnace can be found from a knowledge of the volume of air contained therein and the assumption that ⅕ of this is oxygen, together with use of Equation 3. Allowance must be made, however, for the air which is removed through the pressure compensating valve while the furnace is heating up. A second amount of getter absorbs the oxygen evolved from the manganese oxide, $Mn_2O_3$, during its conversion to MnO according to Equation 1 above, and this quantity can be found from the original weight of manganese oxide used, together with use of Equations 1 and 3. Finally there is the oxygen evolved from the ferric oxide, which is found from the weight of $Fe_2O_3$ which is to be converted to FeO and the use of Equations 2 and 3. Calculations on these lines give an approximate value for the weight of getter material and this provides a basis for a set of trial experiments to calibrate any particular furnace and any given amount of starting materials. As shown by Table 2 it is more dangerous to use slightly too much getter material rather than too little.

The above discussion and explanation has been largely devoted to the use of electrolytic iron powder as the getter material. However, this is not the only suitable one and Table 3 summarises the characteristics obtained with others (again for manganese zinc ferrite). These characteristics were obtained by using optimum amounts of the various getter materials, this amount being indicated in the table after the name of each material.

Table 3

| Getter Material | $\mu_0$ | $\frac{H}{\mu^2} \times 10^6$ | $\mu_0 \times Q$ at 100 kc./s. |
| --- | --- | --- | --- |
| Molybdenum-Permalloy Powder −150 Mesh (6.28% by weight) | 1,500 | 510 | 301,000 |
|  | 1,640 | 540 | 295,000 |
|  | 1,520 | 490 | 314,000 |
|  | 1,580 | 470 | 308,000 |
|  | 1,390 | 540 | 380,000 |
| Powdered Aluminium Commercial (2.93% by weight) | 1,420 | 520 | 240,000 |
|  | 1,440 | 500 | 260,000 |
|  | 1,430 | 485 | 274,000 |
|  | 1,620 | 590 | 302,000 |
| Powdered Electrolytic Manganese −300 Mesh (8.9% by weight) | 1,590 | 610 | 294,000 |
|  | 1,613 | 670 | 286,000 |
|  | 1,650 | 540 | 292,000 |
|  | 1,420 | 540 | 300,000 |
| Carbon Powder, Fine (1.92% by weight) | 1,460 | 525 | 302,000 |
|  | 1,510 | 498 | 298,000 |
|  | 1,490 | 510 | 284,000 |

In the case of carbon, if used on a large scale, facilities must be provided to exhaust the carbon dioxide and carbon monoxide evolved during the process.

The process according to the invention can also be used for continuous production, whereas this is not possible with the known method owing to the impossibility of maintaining three separate regions of different gas composition. The furnace for carrying out the continuous process is gas tight and has mechanical double doors at each end. It is in the form of a long tunnel and has different parts maintained at different temperatures, corresponding to the heat treatment cycle described above. Small trolleys each carrying a set of pressed shapes of the basic materials plus a quantity of getter material, enter at one end and travel through the various temperature regions in times similar to those above, the whole traverse lasting for approximately 24 hours. By means of the double doors at each end only a known volume of air is introduced into the furnace as each trolley enters or leaves. The amounts of getter material used can thus be arranged to keep the amount of oxygen present at an optimum level.

Although the invention has been described with reference to the production of manganese-zinc ferrite it will be obvious to those skilled in the art that the method described above is not limited to this particular ferrite but is equally applicable to the production of all ferrites containing manganeses. The getter material provides a means of controlling the composition of the gas atmosphere and prevents conversion of MnO to higher manganese oxides on cooling.

What we claim is:
1. A method of making a ferrite containing bivalent manganese ions which comprises preparing a mixture of ferric oxide, an oxide of manganese higher than manganous oxide and zinc oxide in amounts equivalent to 55.32 mol percent $Fe_2O_3$, 35.16 mol percent MnO, and 9.52 mol percent ZnO, pressing the said mixture at a pressure of 25 tons per square inch, heating the said mixture at 900° C. in air for 2 hours to stabilise the manganese oxide at $Mn_2O_3$, placing the said mixture alongside but not touching a weight of commercial electrolytic iron powder substantially equal to 6% by weight of the said mixture in a gas-tight sealed furnace having initially an air atmosphere, heating the said furnace up to a temperature of

1250° C. over a period of 4 hours, maintaining the said furnace at 1250° C. for a further period of 4 hours, and cooling down to room temperature over a period of 16 hours.

2. A method of making a ferrite containing bivalent manganese ions which comprises preparing a mixture of oxides including ferric oxide and an oxide of manganese higher than manganous oxide, passing said mixture through a furnace having initially an air atmosphere and different zones maintained at temperatures corresponding to the heating and cooling temperature cycle required for making the said ferrite, and controlling the atmosphere inside said furnace by means of an oxidizable material introduced into said furnace together with but not in contact with said mixture, said oxidizable material being selected from the group consistnig of 200 mesh electrolytic iron powder, 120 mesh aluminum powder, 300 mesh electrolytic manganese powder, fine carbon powder, 150 mesh alloy powder composed of 4% Mo, 79% Ni, 17% Fe, and 150 mesh alloy powder composed of 2% Mo, 81% Ni, 17% Fe, said iron powder having a weight of substantially 6% by weight of said mixture, said aluminum powder having a weight of substantially 2.93% by weight of said mixture, said manganese powder having a weight of substantially 8.9% by weight of said mixture, said carbon powder having a weight of substantially 1.92% by weight of said mixture, and said 150 mesh alloy powder having a weight substantially 6.28% by weight of said mixture, and said heating and cooling temperature cycle comprises heating said mixture up to 1250 degree centigrade over a period of four hours, maintaining the 1250 degree centigrade temperature for a further period of four hours, and cooling to room temperature over a period of sixteen hours.

3. A method of making a ferrite according to claim 2 in which said mixture of oxides comprises ferric oxide, $Fe_2O_3$, manganese oxide, and zinc oxide, $ZnO$.

4. A method of making a ferrite according to claim 3 in which the quantity of $Fe_2O_3$ in said mixture and said temperature cycle is such that said ferrite contains between 49.7 and 50.3 mol percent $Fe_2O_3$.

5. A method of making a ferrite containing bivalent manganese ions which comprises preparing a mixture of oxides including ferric oxide and an oxide of manganese higher than manganous oxide, passing the said mixture through a furnace having initially an air atmosphere and different zones maintained at temperatures corresponding to the heating and cooling temperature cycle required for making said ferrite and controlling the atmosphere inside said furnace by means of an oxidizable material introduced into said furnace together wtih but not in contact with said mixture, said oxidizable material being 200 mesh commercial electrolytic iron powder having a weight substantially equal to from 5.8% to 6.1% by weight of said mixture, and said heating and cooling temperature cycle comprises heating said mixture up to 1250 degree centigrade over a period of four hours, maintaining the 1250 degree centigrade temperature for a further period of four hours, and cooling to room temperature over a period of sixteen hours.

6. A method of making a ferrite containing bivalent manganese ions which comprises preparing a mixture of oxides including ferric oxide and an oxide of manganese higher than manganous oxide, passing said mixture through a furnace having initially an air atmosphere and different zones maintained at temperatures corresponding to the heating and cooling temperature cycle required for making said ferrite, and controlling the atmosphere inside the said furnace by means of oxidizable material introduced into the furnace together with but not in contact with the said mixture, said oxidizable material being 120 mesh aluminum powder having a weight substantially equal to 2.93% by weight of said mixture, and said heating and cooling temperature cycle comprises heating said mixture up to 1250 degree centigrade over a period of four hours, maintaining the 1250 degree centigrade temperature for a further period of four hours, and cooling to room temperature over a period of sixteen hours.

7. A method of making a ferrite containing bivalent manganese ions which comprises preparing a mixture of oxides including ferric oxide and an oxide of manganese higher than manganous oxide, passing said mixture through a furnace having initially an air atmosphere and different zones maintained at temperatures corresponding to the heating and cooling temperature cycle required for making said ferrite, and controlling the atmosphere inside said furnace by means of an oxidizable material introduced into the furnace together with but not in contact with said mixture, said oxidizable material being 300 mesh electrolytic manganese powder having a weight substantially equal to 8.9% by weight of said mixture, and said heating and cooling temperature cycle comprises heating said mixture up to 1250 degree centigrade over a period of four hours, maintaining the 1250 degree centigrade temperature for a further period of four hours, and cooling to room temperature over a period of sixteen hours.

8. A method of making a ferrite containing bivalent manganese ions which comprises preparing a mixture of oxides including ferric oxide and an oxide of manganese higher than manganous oxide, passing said mixture through a furnace having initially an air atmosphere and different zones maintained at temperatures corresponding to the heating and cooling temperature cycle required for making said ferrite, and controlling the atmosphere inside said furnace by means of an oxidizable material, said oxidizable material being fine carbon powder having a weight substantially equal to 1.92% by weight of said mixture, and said heating and cooling temperature cycle comprises heating said mixture up to 1250 degree centigrade over a period of four hours, maintaining the 1250 degree centigrade temperature for a further period of four hours, and cooling to room temperature over a period of sixteen hours.

9. A method of making a ferrite containing bivalent manganese ions which comprises preparing a mixture of oxides including ferric oxide and an oxide of manganese higher than manganous oxide, passing said mixture through a furnace having initially an air atmosphere and different zones maintained at temperatures corresponding to the heating and cooling temperature cycle required for making said ferrite and controlling the atmosphere inside said furnace by means of an oxidizable material, said oxidizable material being 150 mesh alloy powder composed of 4% Mo, 79% Ni, 17% Fe having a weight substantially equal to 6.28% by weight of said mixture, and said heating and cooling temperature cycle comprises heating said mixture up to 1250 degree centigrade over a period of four hours, maintaining the 1250 degree centigrade temperature for a further period of four hours, and cooling to room temperature over a period of sixteen hours.

10. A method of making a ferrite containing bivalent manganese ions which comprises preparing a mixture of oxides including ferric oxide and an oxide of manganese higher than manganous oxide, passing said mixture through a furnace having initially an air atmosphere and different zones maintained at temperatures corresponding to the heating and cooling temperature cycle required for making said ferrite, and controlling the atmosphere inside said furnace by means of an oxidizable material, said oxidizable material being 150 mesh alloy powder composed of 2% Mo, 81% Ni, 17% Fe having a weight substantially equal to 6.28% by weight of said mixture, and said heating and cooling temperature cycle comprises heating said mixture up to 1250 degree centigrade over a period of four hours, maintaining the 1250 degree temperature for a further period of four hours, and cooling to room temperature over a period of sixteen hours.

(References on following page)

References Cited in the file of this patent

UNITED STATES PATENTS

| | | |
|---|---|---|
| 2,736,708 | Crowley et al. | Feb. 28, 1956 |
| 2,842,500 | Gibson et al. | July 8, 1958 |

FOREIGN PATENTS

| | | |
|---|---|---|
| 450,776 | Canada | Aug. 24, 1948 |
| 552,377 | Canada | Jan. 28, 1958 |
| 730,703 | Great Britain | May 23, 1955 |
| 735,833 | Great Britain | Aug. 31, 1955 |
| 737,284 | Great Britain | Sept. 21, 1955 |
| 1,086,818 | France | Aug. 18, 1954 |

OTHER REFERENCES

Gorter: Proceedings of the IRE, December 1955, pp. 1952, 1953, 1960.

Harvey et al.: RCA Review, September 1950, pp. 344–349.